Feb. 7, 1933.  A. PEISELER  1,896,199
APPARATUS FOR THE PRODUCTION OF FILES AND FILE CASINGS
Filed May 30, 1928   3 Sheets-Sheet 1

Inventor:
Alfred Peiseler
by
Attorney

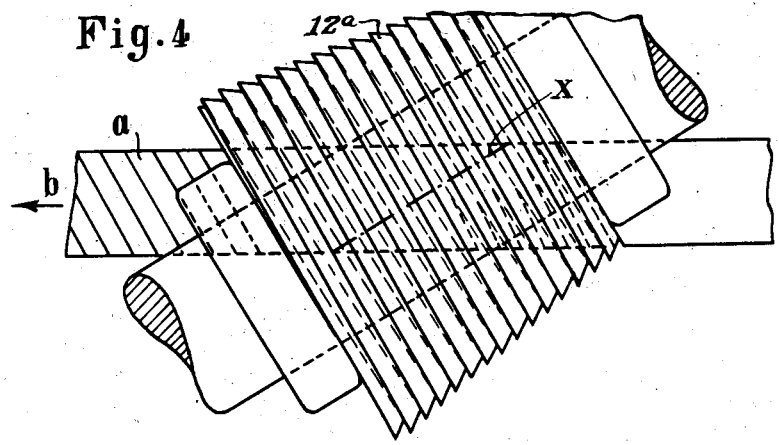
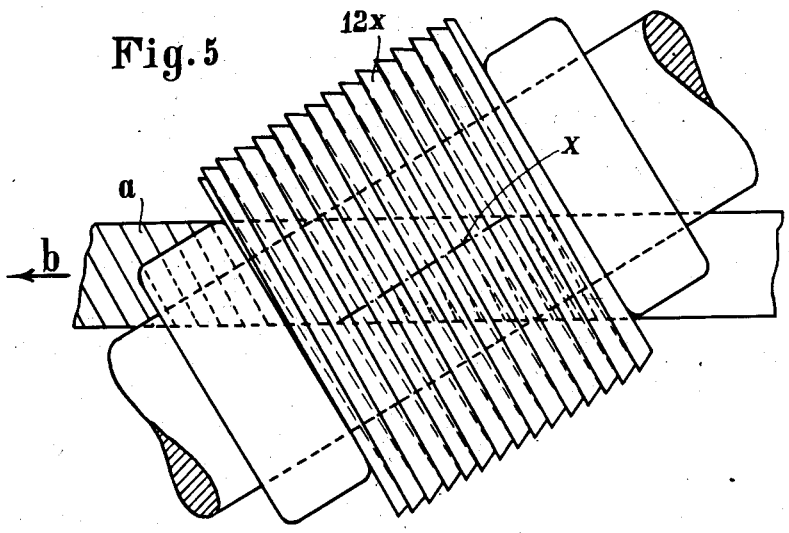
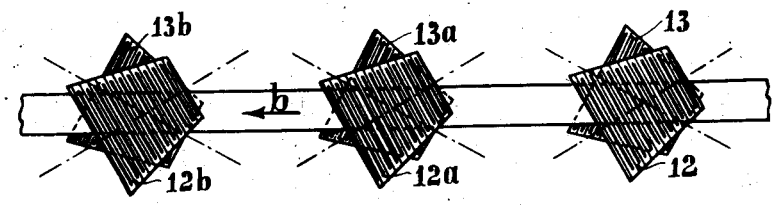

Feb. 7, 1933.　　　　　A. PEISELER　　　　　1,896,199
APPARATUS FOR THE PRODUCTION OF FILES AND FILE CASINGS
Filed May 30, 1928　　　3 Sheets-Sheet 3

Inventor:
Alfred Peiseler,
by Paul E. Schilling,
Attorney.

Patented Feb. 7, 1933

1,896,199

UNITED STATES PATENT OFFICE

ALFRED PEISELER, OF REMSCHEID-HADDENBACH, GERMANY

APPARATUS FOR THE PRODUCTION OF FILES AND FILE CASINGS

Application filed May 30, 1928, Serial No. 281,596, and in Germany June 1, 1927.

In the known process of producing files and file casings by milling, rotating cutters are used of a type having rows of teeth arranged circularly around the periphery of the cutter in such manner that the planes in which the rows of teeth are arranged are perpendicular to the cutter axis, the process being carried out, for example, in the case of files having two flat faces and a corresponding number of narrower side edges, in the following manner: A number of stock blanks are clamped together in a holder so that the faces thereof to be cut form a plane surface, and thereupon a roller milling cutter of the above-mentioned type is brought into engagement with said surface and rotated and moved along the surface to simultaneously cut the presented faces of the file blanks throughout the length thereof. When one face of each file blank in the stock is provided with teeth in this manner then the blanks or file pieces are removed from the clamping device, turned over, reclamped in the holder, and the cutter operated to cut along the plane surface formed by the opposite faces of the blanks. This is repeated, in making files having more than two file faces, until all the faces of the file blanks to be provided with teeth have been treated. This known process is troublesome and, because of the number of operations required, involves a considerable waste of time, including that occurring through idleness of the cutter in shifting it at the end of a cutting operation back to begin a new cutting operation. Furthermore, very long and costly cutters are necessary for carrying out the above process.

The object of the present invention is to provide an apparatus for overcoming the above-noted objections to the prior milling process, as hereinafter described.

The accompanying drawings show an apparatus for use in carrying out a process of manufacture wherein it is assumed that a continuous steel band stock blank or strip is used instead of individual blanks and is provided on three sides with file teeth and is then transversely cut into sections, each forming a file.

Figure 1 drawn to a reduced scale shows in side view the essential parts of the apparatus as employed for cutting a file blank.

Figure 2 is a plan view of some of the parts shown in Figure 1 and omitting other parts.

Figure 3, drawn to approximately full scale, shows in side elevation a helical milling cutter for the production of teeth on the narrow side of a blank.

Figures 4 and 5, drawn to approximately full scale, show respectively a conical and a cylindrical milling cutter for the treatment of the broad or wide faces of a blank.

Figure 6 shows in plan, and by way of example, an arrangement of successive milling cutters which act to gradatively cut teeth upon the broad faces of a blank.

Figure 1:
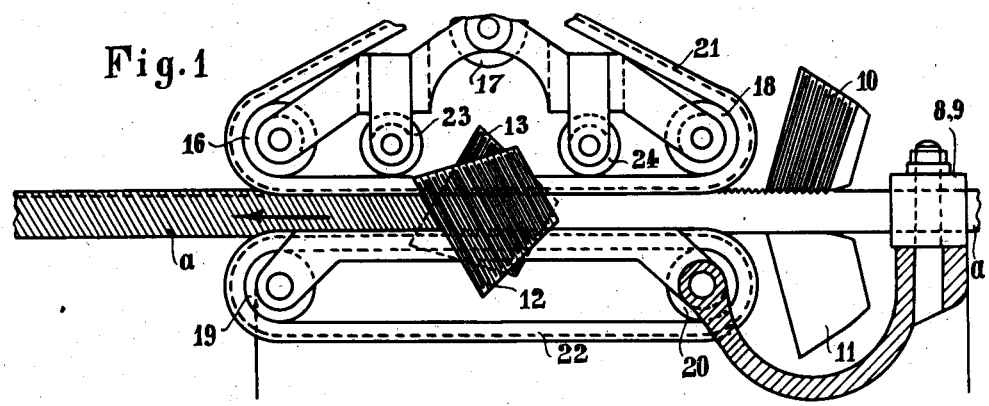
Figure 2:
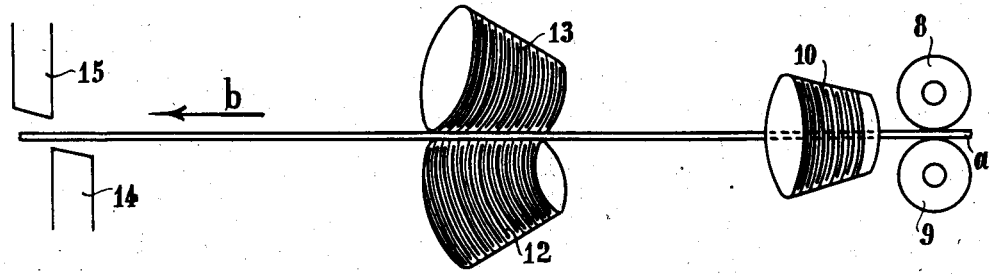

In Figures 1, 2, the numerals 8 and 9 designate a positively driven roller pair between which a stock blank strip $a$ is led in such manner that the rollers are in contact with two opposed sides of the strip. The roller pair serves to feed the strip constantly in the direction of the arrow $b$.

In practice a straightening roller mill of known type may be arranged in front of the roller pair 8, 9, considered in the direction of feed of the strip $a$, for the purpose of flattening or straightening out the strip $a$ from the curved shape in which it is delivered from a supply roller. This roller mill is not shown, as it constitutes no part of my present invention. The roller pair 8, 9 may form a part, for example, the last roller pair, of the straightening roller mill.

Arranged above the strip blank $a$, and in advance of the roller pair 8, 9 in the direction of feed motion of the strip blank, is a milling cutter 10 of conical form and provided upon its periphery with a continuous helicoidal cutting blade. The axis of this cutter lies in the same vertical plane as the strip blank and extends longtudinally in the same general direction as the strip and is so inclined to the horizontal plane of the upper edge of the strip as to dispose its cutting surface to cut diagonally across the edge of the strip blank as the cutter is revolved during the feed motion of the strip blank. The cutter 10 acts to provide the upper edge of the strip $a$ with a continuous row of file teeth. It is driven in accordance with the feeding speed of the strip blank in such manner that the convolutions of its cutting blade travel along the screw thread like teeth produced by said convolutions of the blade in the upper edge of the strip. A smooth conical roller 11 is arranged in contact with the lower face of the steel strip $a$ to back the same against the working pressure of the cutter 10.

Arranged beyond the cutter 10 in the feeding direction of the band $a$ are two helical milling cutters 12, 13 which operate to cut file teeth in the two opposite sides of the strip blank. The two cutters 12, 13 lie directly opposite each other, so that each cutter will back the strip blank against the working pressure of the other. The cutters 12, 13 are so arranged that they lie axially at reverse angles vertically with respect to the horizontal plane of the strip blank and also on lines which extend convergently at oblique angles rearwardly and transversely to the horizontal plane of the strip blank. The particular angular arrangement of the cutters with respect to the strip blank may, however, be varied and will, of course, depend on the desired angle of the cutting edge of the file teeth to be produced. Both cutters 12, 13 are, because of their aforesaid angular arrangement, in contact with the strip blank along diagonal lines (see the line $x$ in Fig. 4), so that the feeding strip blank is subjected to a continuous cutting action by the cutters. The feeding movement of the strip $a$ relatively to the cutters 12, 13 operating on its opposite lateral faces is, as will be seen from the drawings, inclined to the line of contact of the conical surface of the cutter. The cutters 12, 13, like the cutter 10, are driven at a suitable speed in accordance with the feed speed of the strip blank $a$ so that their cutting blades will travel in the screw thread like teeth produced by them on the faces of the strip blank.

In advance of the cutters 12, 13, in the direction of feed motion of the strip blank $a$, is arranged a pair of knives or blades 14, 15, one at least of which is movable with relation to, i. e., toward and from, the other. The cutting shears 14, 15 are closed at predetermined intervals dependent on the feeding velocity of the strip blank and in such manner that a cutting movement is exerted each time a portion of the strip sufficient to form a file of the intended length passes between the shearing cutters.

As the feed pressure of the roller pair 8, 9 may be insufficient to give the desired positive feeding movement to the blank $a$, a further feed means is provided to engage the strip and move it positively during its treatment by the cutters. This additional feeding means consists of two endless belts or link chains 21, 22 disposed respectively above and below the strip and guided by rollers 16, 17, 18, and 19, 20, said chains being in contact with the upper and lower narrow edges or faces of the blank. The members of the upper chain 21 are provided on the outside with teeth whose form and spacing agree with the form and spacing of the file teeth produced by the cutter 10 and act on said teeth to push the blank uniformly forward. In order to ensure certain engagement of the teeth of the chain 21 with the teeth on the blank $a$ two adjustable pressure rollers 23, 24 are provided crosswise to the steel strip and between the rollers 16, 17 which pressure rollers 23, 24 are guided or forced by suitable means against the flat part of the chain 21 which at the time engages the upper edge of the blank $a$. The lower belt or link chain 22 supports the blank and exerts a frictional feeding pressure thereon.

Figure 7:
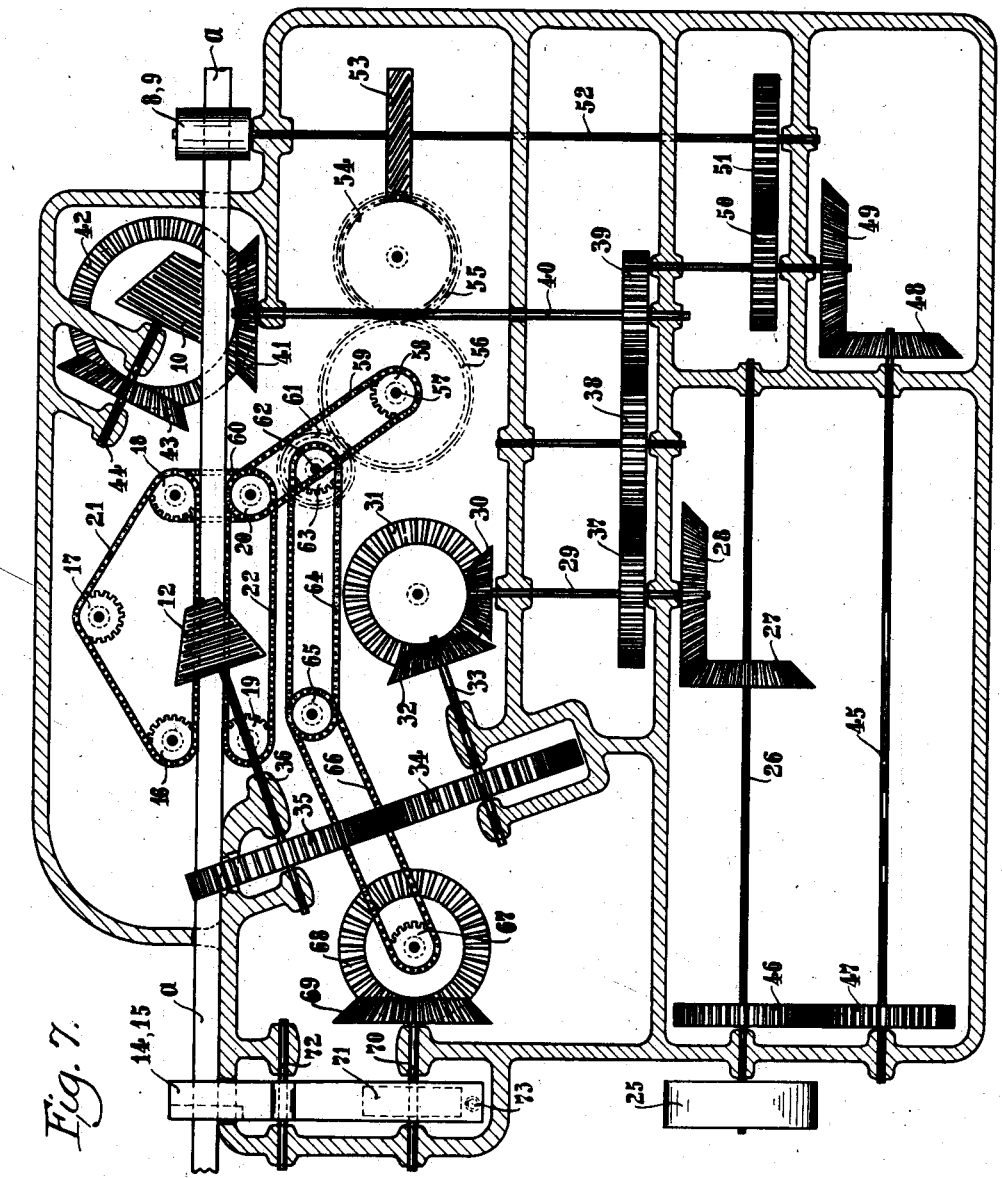
Figure 7 is a sectional view schematically showing the drive gearing for the working parts.

The operation of the apparatus is as follows:

The continuous steel strip blank $a$ coming from the supply roller is constantly pushed forward in the direction of the arrow $b$ by the rollers 8, 9 and the endless chains 21, 22. During this movement file teeth are cut first by the cutter 10 on the narrow upper edge of the strip and the cutters 12, 13 cut file teeth simultaneously on both lateral faces of the strip. The strip $a$ thus provided with teeth finally runs through the cutting shears 14, 15 which cut off a portion of the strip corresponding in length to the intended length of a file blade to be produced and which only requires to be provided with a tang to be ready for use. The formation of the tang can be effected in any suitable manner by suitably shaping one end of the file blade. In a similar manner also file casings can be produced. In this case the steel strip is provided only on its side faces with teeth so that the cutter 10 and its counter roller 11 can be omitted. If the file casing is to be provided with teeth only on one side face then one of the two cutters 12, 13 is omitted and a smooth roller is arranged in its place to back the blank against the pressure of the working cutter. The working parts above described may be actuated by any suitable drive gearing. In Figure 7 one type of drive gearing for the purpose is illustrated.

As shown, the drive for the milling tools as well as for the feed mechanisms and the shears starts from the pulley 25. The latter transmits the power to the jack shaft 26, thence over the bevel gear pair 27, 28 and the vertical shaft 29 to a second pair of bevel gears 30, 31. From here over bevel gear 32 to the oblique shaft 33 and the gears 34, 35, which then drive the work shaft 36 of the cone miller 12.

The miller 10, operating on the narrow face of the file blade $a$, is driven from vertical shaft 29 over 37, 38, 39 and transmitted to the vertical shaft 40. The bevel gear 41 on upper end of shaft 40 drives the two bevel gears 42, 43 and the shaft 44 of milling tool 10.

The feed drive for the band $a$ is derived from the jack shaft 45 which is coupled with the shaft 26 by means of 46, 47. Shaft 45 drives the vertical shaft 52 through gears 48, 49 and 50, 51, to which shaft 52 is fixed the feed roller 8 for the stock blank $a$. Below the roller 8 on shaft 52 there is provided a wheel 53 which meshes with gear 54, and drives through gears 55, 56 the sprocket wheel 58 mounted upon the shaft 57 of toothed wheel 56. 58 drives by means of chain 59 the belt 22, which then in turn drives the upper feed belt 21.

Gear 56 meshes with a toothed wheel 61, whose shaft 62 drives the shaft 70 and its cam 71 over a double chain drive 63, 64, 65, 66 and 67 and the gear pair 68, 69. The cam 71 operates the shears 14, 15 swinging about shaft 72. At the lower free end the shear legs 14, 15 are connected by the common spring 73, which ensures a close touch with the cam 71. The whole mechanism is enclosed by a housing.

Figure 3:
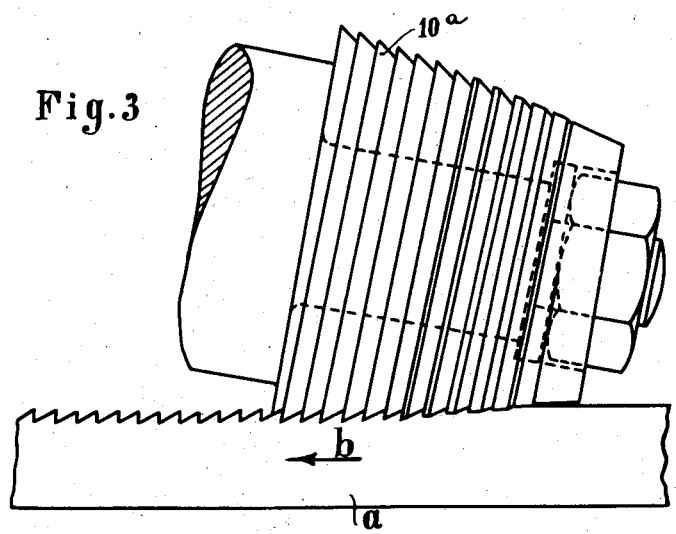

If it be desired to produce files or file casings with coarse teeth, then it is advisable to cut the teeth gradually or by progressive cutting actions to the full depth instead of cutting them to full depth on a single cutting action. For this purpose the cutter to be used for operation on the upper edge of the strip $a$ may be formed both as a preliminary cutter and a chaser or finishing cutter by providing it with a cutting blade which gradually increases in depth from its starting to its finishing convolution, as is illustrated by the cutter $10^a$ in Fig. 3 of the drawings. This however is impossible with cutters operating on the side faces of the strip because the convolutions of the cutter cannot on account of the width of these faces travel without interference on successive teeth of the strip as formed. Therefore at least two cutters lying behind one another in the feeding direction of the strip should be provided to successively act on each side face of the strip, of which cutters one may be formed as a preliminary cutter and the other as a chaser or finishing cutter; or three or more cutter pairs 12, $12a$, $12b$, 13, $13a$, $13b$ arranged behind one another and with different depths of teeth may be used in such manner that the file teeth will be gradiently cut in three or more successive stages.

When using conical cutters as shown by cutter $12^a$ in Fig. 4 the file teeth may be given a positive front rake. If no importance is attached to the provision of a positive front rake then cutters of cylindrical form and provided with a continuous thread-like cutting blade can be used instead of conical cutters. Such a cylindrical cutter $12x$ is illustrated by way of example in Fig. 5. The cylindrical cutter can also be formed for the production of teeth on the narrow edges of blanks, both as a preliminary cutter and a chaser, while for the treatment of a wide face of the blank several successive cutters suitable for gradually cutting the file teeth to the intended depth may be used. In each case the cutter $12a$—$12x$ has its axes, as shown by line $x$, arranged at an oblique angle to the surface of the blank on which it acts.

If it is desired to subdivide the file teeth on the broad faces of the steel strip by so called clearance grooves then these grooves can be produced immediately after the cutting of the teeth by means of suitable planing or slotting tools which are arranged in the feed direction of the strip $a$ behind the cutters 12—13 and between which the steel blank is fed.

Instead of providing a continuous stock strip with file teeth and then cutting it into pieces, files or file casings can also be produced by providing stock strips or blanks of a desired length by forging or other like operation and then forming said stock blanks with teeth according to the new process. In the latter case the blanks may be arranged end to end and successively and in close order fed to and between oppositely disposed cutters, as will be readily understood. Such individual blanks can be held in a gauge or rtemplate consisting of an iron or steel band of a suitable length having openings for the reception of a file and possessing such a thickness that the surfaces of the blanks to be treated will be properly exposed.

It will be evident that the process herein disclosed overcomes the noted objection to the milling process heretofore employed. It will be seen that in this new process so-called helical cutters or worm hobs are used, that is, milling cutters whose cutting teeth are arranged on a helical line extending around the peripheral surface of the cutter, and that in this new process the relative movement between cutter and blank is not only crosswise to the cutter axis (that is, in the direction of the teeth to be produced), but is at the same time in the direction of the cutter axis, i. e., crosswise of the teeth to be produced, or, in other words, the movement between cutters and file blank is oblique to the contact line of the surface of the helically threaded cutter so that the cutter travels on the blank like a worm on a worm wheel. An uninterrupted working is thus obtained similar to that used in the production of pinions according to the helicoidal cutter process so that the file blanks used for the production of files or file casings can be fed continuously along to and in contact with the cutter. By the simultaneous use therefore of several cutters all faces of the file blanks or file casing blanks to be provided with teeth can be cut in a single continuous working operation. In the new process the troublesome and time wasting clamping and unclamping of the file blanks, as well as the individual treatment of the different side faces of the file blanks, are omitted. So also is the idle return movement of the cutter or of a slide carrying the blank. Thus the new process is essentially simpler and more practicable than the process hitherto generally in use. The process has the further advantage that its time period is shortened and therefore cheaper cutters can be used than heretofore.

In making a file having three file faces in the practical carrying out of the present process, and cut to size file blanks are formed with teeth first of all on one of its narrow sides or edges and then simultaneously on the broad sides or faces, which has the advantage that the burrs or rough edges on the broad sides produced by the cutter for the narrow side are removed by the cutters operating on the broad sides. It may be remarked that the movement between the cutter treating the narrow side of the file blank and the blank need not necessarily be oblique to the contact line of the cutter's peripheral surface, but the movement can, on account of the small width of the narrow side of the blank, be disposed in the direction of the cutter axis as is known in the production of saw teeth by means of helical cutters.

I claim:—

1. An apparatus for cutting file teeth on file blades, comprising a rotary milling cutter having a thread-like cutter blade, and means for supporting a blank and producing relative feed motion between the blank and cutter in the direction of the length of the blank and at an oblique angle to the cutting plane of the acting cutting surface of the cutter so as to cause the thread-like cutting blade of the cutter to cut at spaced intervals across a surface of the blank along the length of the latter, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

2. An apparatus for cutting file teeth on file blanks, comprising a rotary milling cutter having a helical cutter blade upon its periphery, and means for supporting a blank and producing relative feed motion between the blank and cutter in the direction of the length of the blank so as to cause the thread-like cutting blade of the cutter to cut at spaced intervals across a surface of the blank along the length of the latter, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

3. In an apparatus for cutting file teeth on file blanks, means for supporting and longitudinally feeding a blank, and a rotary milling cutter arranged to cut across a surface of the blank and of greater diameter than the width of said surface, said cutter having a cutter blade of the form of a screw thread the convolutions of which in the rotation of the cutter operate to cut teeth at regular intervals along the length of the blank, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

4. In an apparatus for cutting file teeth on file blanks, means for supporting and longitudinally feeding a blank, and a rotary milling cutter arranged to cut across a surface of the blank and of greater diameter than the width of said surface, said cutter having a helical cutter blade the convolutions of which in the rotation of the cutter operate to cut teeth at regular intervals along the length of the blank, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

5. In an apparatus for cutting file teeth on file blanks, means for supporting and longitudinally feeding a blank, and a conical rotary milling cutter arranged to cut across a surface of the blank and of greater diameter than the width of said surface, said cutter having a cutter blade of the form of a screw thread the convolutions of which in the rotation of the cutter operate to cut teeth at regular intervals along the length of the blank, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

6. In an apparatus for cutting file teeth on file blanks, a rotary cutter, means for supporting a file blank and causing relative feed motion between the cutter and blank in the direction of the length of the latter, said cutter having a peripheral cutting surface of screw form, portions of the convolutions of which act in the orbit of rotation of the cutter to cut teeth at determined intervals along the blank, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

7. In an apparatus for cutting file teeth on file blanks, a rotary cutter, means for supporting a file blank and causing relative feed motion between the cutter and blank in the direction of the length of the latter, said cutter having a helical cutting blade the convolutions of which act in the orbit of rotation of the cutter to cut teeth at determined intervals along the blank, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

8. In an apparatus for cutting file teeth on file blanks, a conical rotary cutter, means for supporting a file blank and causing relative feed motion between the cutter and blank in the direction of the length of the latter, said cutter having a peripheral cutting surface of screw form portions of the convolutions of which act in the orbit of rotation of the cutter to cut teeth at determined intervals along the blank, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

9. In an apparatus for cutting file teeth on file blanks, a rotary conical milling cutter having a helical cutting blade and arranged to cut teeth upon an edge of a file blank, a pair of conical milling cutters having helical cutting blades and arranged to cut teeth upon opposite sides of a file blank in rear of the first-named cutter, and means for supporting a file blank and feeding it longitudinally relative to the cutters, each cutter of the pair having its axis arranged at an acute angle sufficient to cause the cutting edges to cut diagonal file teeth in the blank, each cutter of the pair being of sufficient length to engage the blank on a line perpendicular to the file teeth cuts and extending entirely across the blank.

10. In an apparatus for cutting file teeth on file blanks, a rotary conical milling cutter having a helical cutting blade and arranged to cut teeth upon an edge of a file blank, means for supporting a file blade for the action thereon by said cutter, and means engageable with the teeth formed by the cutter for feeding the file blank, said cutter having its axis arranged at an acute angle sufficient to cause the cutting edges to cut diagonal file teeth in the blank, said cutter further being of sufficient length to engage the blank on a line perpendicular to the file teeth cuts and extending entirely across the blank.

In testimony whereof I affix my signature.
ALFRED PEISELER.